C. E. WADDILL.
STOCK WATER HEATER.
APPLICATION FILED MAY 3, 1917.
1,288,310.
Patented Dec. 17, 1918.
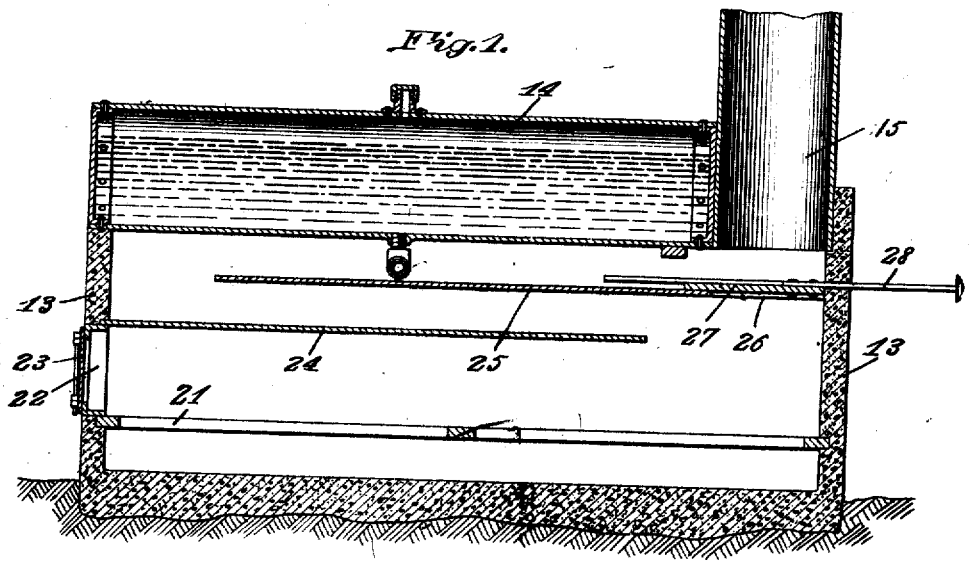
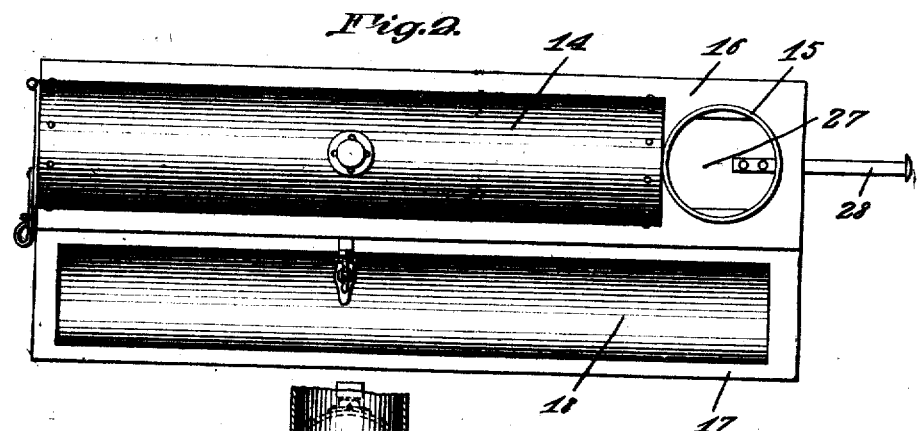
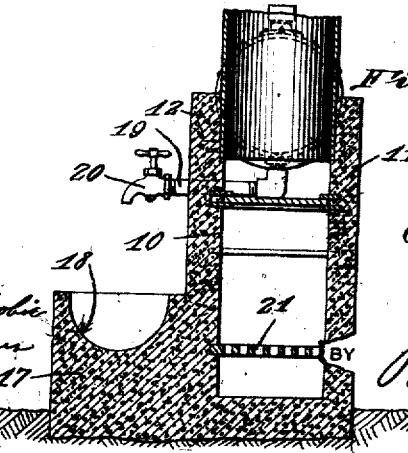
Clarence E. Waddill, INVENTOR
WITNESSES
BY Richard B. Owen
ATTORNEY

UNITED STATES PATENT OFFICE.

CLARENCE E. WADDILL, OF TENNESSEE, ILLINOIS.

STOCK WATER-HEATER.

1,288,310.  Specification of Letters Patent.  Patented Dec. 17, 1918.

Application filed May 3, 1917. Serial No. 166,206.

*To all whom it may concern:*

Be it known that I, CLARENCE E. WADDILL, a citizen of the United States, residing at Tennessee, in the county of McDonough and State of Illinois, have invented certain new and useful Improvements in Stock Water-Heaters, of which the following is a specification.

This invention has relation to stock watering fountains, and has for an object to provide a fountain of the type embodying means for heating the water.

An object of the invention is to provide a novel structure integral throughout to provide a reservoir setting for a furnace structure, and a watering trough located in proximity to the furnace whereby the heat of the walls thereof may serve to impart heat to the water in the trough.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:

Figure 1, is a view in vertical longitudinal section taken through a stock watering fountain constructed after the manner of my invention.

Fig. 2, is a view of the fountain in plan, and

Fig. 3, is a vertical transverse section.

With reference to the drawings 10 indicates generally an integral structure, formed preferably of concrete and including a furnace structure 11 which may be more or less rectangular in configuration, including vertical side walls 12 and end walls 13 defining a compartment therein which extends throughout the length of the structure and whose width is narrow compared to its height. The top of the furnace structure is open to permit the partial entrance therein of a reservoir indicated at 14. The reservoir is preferably a cylindrical tank disposed horizontally and of a length to extend nearly throughout the length of the structure, being spaced from one end thereof, preferably the rear end, to permit the insertion into the chamber of a vertical smoke pipe 15 which enters an opening provided for that purpose in a partial closure 16 of the top of the furnace structure at that end. The balance of the integral structure includes a lateral extension 17 at one side thereof and adjacent the lower portion thereof with the top surface of said lateral extension 17 hollowed out to form a semi-cylindrical concavity 18 designed to serve as a watering trough. An outlet 19 in the shape of a pipe or other conduit leads from the bottom of an intermediate portion of the tank or reservoir 14 through one side wall 12 of the furnace structure, with a faucet 20 on the outer projecting end of said conduit 19 for permitting the flow of water from the reservoir into the trough.

A grate structure 21 is located within the chamber or furnace compartment, said grate being formed of parallel spaced bars extending throughout the length of the furnace, from side to side and preferably closely spaced from the floor of the furnace chamber. An opening 22 in the front end of the furnace, is normally closed by a fire door 23 which serves as a means of permitting the introduction of fuel. A baffle plate 24 is disposed in spaced relation above the grate, is extended from side to side of the furnace chamber, and from the front end thereof toward the rear, with the rear end of said baffle plate in spaced relation from the rear wall of the furnace. It is to be noted that the baffle plate is also spaced below the bottom of the reservoir. A second baffle plate 25 is interposed between the baffle plate 24 and the reservoir 14 and extends from the rear wall of the furnace toward the front, with the front end of said baffle plate 25 spaced inwardly from the front wall of the furnace. An opening 26 is formed in said baffle plate 25 adjacent the rear wall of the furnace and beneath the smoke pipe 15, and a damper 27 normally covers said opening 26, said damper being in the form of a plate resting on the baffle plate 25 with a handle 28 connected to said damper and projecting through the rear wall of the furnace whereby said plate may be shifted to cover or uncover said opening 26 as desired and for a purpose which will be presently obvious.

As stated above the fuel is inserted through the opening 22 and distributed upon the grate and ignited. The products of combustion pass upward and are directed by the baffle plate 24 rearwardly whereupon the products of combustion passing around the rear end of said baffle plate, are drawn forward between the baffle plates 24 and 25, around the forward end of said baffle plate 25, and again rearwardly between said baffle plate 25 and the lower end of the reservoir, and out through the smoke pipe. The products of combustion take this course when the damper is in a closed position, or overlapping the opening 26. It will be remembered that if corn cobs, trash, such as papers, etc., be burned in a furnace of any character, the material will burn vigorously for a short while, producing great heat. It is not the object of this stock watering fountain to heat the water in the reservoir to boiling point, or any temperature in proximity thereto, but merely to retain the water at a temperature somewhat above the freezing point. It will therefore be obvious that the baffle plates 24 and 25 will serve to rob the products of combustion of the heat carried thereby with the result that the baffle plates are warmed, and the gases are somewhat cooled before coming in contact with the reservoir. Thus, the possibility of raising the temperature of the water in the reservoir to an undue degree is reduced and should the temperature of the water be increased at too rapid a rate, the damper may be moved to open position so as to unlap the opening 26 whereby the gases may ascend directly to the smoke pipe 15. During combustion of the material within the furnace, the walls and other parts of the integral structure 10 are warmed. The baffle plates 24 and 25 will also be warmed and through a combination of both the water within the reservoir will be retained at a slightly elevated temperature for a considerable length of time after the fire upon the grate has become extinguished. It will also be obvious that the heat of the furnace walls will be transmitted to the lateral integral structure in which the trough opening 18 is located whereby to impart heat to the water within the trough.

I am aware that furnace structures or the like have heretofore been devised with baffle plates for the purpose of providing a circuitous course for the gases in order to extract the heat therefrom, however, I do not lay claim particularly to the use of baffle plates for this purpose, but rather for the purpose of providing a medium for the absorption and retention of heat. I am further aware that fountains of this character have been devised with a view to heating water, however, I am not aware that a fountain has been heretofore constructed embodying an integral structure affording a setting for a reservoir and a watering fountain in proximity whereby to encourage the transmission of heat throughout the structure for the purpose above set forth.

Having thus described my invention what I claim as new and desire to secure by Letters Patent is:

In a stock watering fountain, a furnace structure of oblong configuration open at the top for the greater part of its length and having a trough on one side, a tank mounted in the open top of the structure, a grate mounted in the structure to extend from end to end thereof, baffle plates superposed above the grate to extend toward each other from opposite ends of the furnace, and having their free ends in spaced relation to the end walls of the furnace, a smoke pipe located at one end of the furnace structure adjacent the end of the tank, the uppermost baffle plate having an opening formed beneath said smoke pipe, a damper slidably mounted on said baffle plate to open and close the opening, a handle for said damper extending through the wall of the furnace, guides secured to the furnace wall to engage the upper sides of the damper to form in connection with the baffle plate a guiding means for the damper, and an outlet from the tank to the trough.

In testimony whereof I affix my signature in presence of two witnesses.

CLARENCE E. WADDILL.

Witnesses:
ALONZO CLARK,
O. O. WADDILL.